US011608480B2

(12) United States Patent
Seiler et al.

(10) Patent No.: US 11,608,480 B2
(45) Date of Patent: Mar. 21, 2023

(54) SURFACTANT COMPOSITION COMPRISING AN AMYLASE

(71) Applicant: Henkel AG & Co. KGaA, Duesseldorf (DE)

(72) Inventors: Martina Seiler, Duisburg (DE); Timothy O'Connell, Landsberg am Lech (DE); Dieter Nickel, Pulheim (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 543 days.

(21) Appl. No.: 16/348,005

(22) PCT Filed: Oct. 20, 2017

(86) PCT No.: PCT/EP2017/076855
§ 371 (c)(1),
(2) Date: May 7, 2019

(87) PCT Pub. No.: WO2018/086846
PCT Pub. Date: May 17, 2018

(65) Prior Publication Data
US 2019/0256804 A1    Aug. 22, 2019

(30) Foreign Application Priority Data

Nov. 8, 2016  (DE) .................... 10 2016 221 849.2

(51) Int. Cl.
| | | |
|---|---|---|
| C11D 3/386 | (2006.01) | |
| C11D 1/22 | (2006.01) | |
| C11D 1/722 | (2006.01) | |
| C11D 1/83 | (2006.01) | |
| C11D 11/00 | (2006.01) | |
| C11D 1/72 | (2006.01) | |
| C11D 1/29 | (2006.01) | |

(52) U.S. Cl.
CPC ............ *C11D 3/38618* (2013.01); *C11D 1/22* (2013.01); *C11D 1/722* (2013.01); *C11D 1/83* (2013.01); *C11D 11/0017* (2013.01); *C11D 1/29* (2013.01); *C11D 1/72* (2013.01); *C12Y 302/01001* (2013.01)

(58) Field of Classification Search
None
See application file for complete search history.

(56) References Cited

U.S. PATENT DOCUMENTS

| | | | | |
|---|---|---|---|---|
| 5,922,664 A * | 7/1999 | Cao | ....................... | C11D 17/003 510/340 |
| 6,583,096 B1 * | 6/2003 | Kott | ........................ | C11D 1/22 510/357 |
| 2012/0238005 A1 * | 9/2012 | Wieland | ................ | C11D 3/361 510/393 |
| 2014/0227764 A1 | 8/2014 | Hellmuth et al. | | |
| 2016/0287669 A1 * | 10/2016 | Iwakura | ................. | A61P 25/28 |

FOREIGN PATENT DOCUMENTS

| | | | |
|---|---|---|---|
| DE | 102005062984 A1 | 7/2007 | |
| DE | 102007044415 A1 * | 3/2009 | ............ C11D 3/386 |
| EP | 1240525 A2 | 9/2002 | |
| EP | 1305432 A2 | 5/2003 | |
| WO | 9206165 A1 | 4/1992 | |
| WO | 9629397 A1 | 9/1996 | |
| WO | 9714804 A1 | 4/1997 | |
| WO | 9812307 A1 | 3/1998 | |
| WO | 9964619 A2 | 12/1999 | |
| WO | 0043476 A2 | 7/2000 | |
| WO | 0060063 A1 | 10/2000 | |
| WO | 02099091 A2 | 12/2002 | |
| WO | 2013060621 A1 | 5/2013 | |
| WO | 2014183921 A1 | 11/2014 | |
| WO | 2016096714 A1 | 6/2016 | |
| WO | WO-2016180748 A1 * | 11/2016 | ........... C12N 9/2417 |

OTHER PUBLICATIONS

Machine translation of DE-102007044415-A1, published 2009, downloaded from the EPO on Aug. 28, 2021 (Year: 2009).*
EPO, International Search Report issued in International Application No. PCT/EP2017/076855, dated Feb. 27, 2018.
Morris et al: "Formulating liquid detergents for multiple enzyme stability", XP001185775; Jan. 2004; Cognis Corporation; Ambler, PA.
Chenna et al: "Multiple sequence alignment with the Clustal series of programs", Nucleic Acid Research, Mar. 2003, vol. 31, No. 13, pp. 3497-3500; Oxford University Press.
Notredame et al: "T-Coffee: A novel method for fast and accurate multiple sequence alignment", (2000) J. Mol. Biol. 302, pp. 205-217; 2000 Academic Press.
Eur. J. Biochem: "Nomenclature Committee of the International Union of Biochemistry and Molecular Biology (NC-IUBMB), Enzyme Nomenclature, Recommendations 1992, Supplement: corrections and additions" 1994, 223, pp. 1-5; Academic Press, Orlando Florida.
Eur. J. Biochem: "Nomenclature Committee of the International Union of Biochemistry and Molecular Biology (NC-IUBMB), Enzyme Nomenclature, Recommendations 1992, Supplement 2: corrections and additions (1994)" 1995, 232, pp. 1-6; The Babraham Institute, Cambridge, England.

(Continued)

*Primary Examiner* — Susan M Hanley
(74) *Attorney, Agent, or Firm* — Lorenz & Kopf, LLP (57) ABSTRACT

The present disclosure relates to a liquid surfactant composition containing a surfactant mixture, water and at least one amylase as defined herein. The present disclosure also relates to a method for cleaning textiles including providing a washing liquor by dosing a liquid surfactant composition, mixing this dosage into at least one solvent, and bring the resulting mixture into contact with the textiles.

19 Claims, 1 Drawing Sheet
Specification includes a Sequence Listing.

(56) References Cited

OTHER PUBLICATIONS

Eur. J. Biochem: "Nomenclature Committee of the International Union of Biochemistry and Molecular Biology (NC-IUBMB), Enzyme Nomenclature, Recommendations 1992, Supplement 3: corrections and additions (1995)" 1996, 237, pp. 1-5; The Babraham Institute, Cambridge CB2 4AT, England.

Eur. J. Biochem: "Nomenclature Committee of the International Union of Biochemistry and Molecular Biology (NC-IUBMB), Enzyme Nomenclature, Recommendations 1992, Supplement 4: corrections and additions (1997)" 1997, 250, pp. 1-6; The Babraham Institute, Cambridge CB2 4AT, England.

Eur. J. Biochem: "Nomenclature Committee of the International Union of Biochemistry and Molecular Biology (NC-IUBMB), Enzyme Supplement 5 (1999)" 1999, 264, pp. 610-650; Trinity College, Dublin 2, Ireland.

Altschul, S.F. et al: "Basic local alignment search tool." J. Mol. Biol. (1990), 215, pp. 403-410, May 1990; National Center for Biotechnology Information, National Library of Medicine, National Institute of Health, Bethesda, M D 20894, USA.

Altschul, S.F. et al: "Gapped BLAST and PSI-BLAST: a new generation of protein database search programs" Nucleic Acids Research, 1997, vol. 25, No. 17, pp. 3389-3402; Jul. 1997; National Center for Biotechnology Information, National Library of Medicine, National Institute of Health, Bethesda, M D 20894, USA.

Gornall, G. et al: "Determination of Serum Proteins by Means of the Biuret Reaction", J. Biol. Chem. 177, pp. 751-766, Aug. 1948; Department of Pathological Chemistry, University of Toronto, Toronto, Canada.

Raay, Hans Georg van, Saran, Herbert and Verbeek, Hans. "Zur Bestimmung der proteolytischen Aktivität in Enzymkonzentraten und enzymhaltigen Wasch-, Spülund Reinigungsmitteln" Tenside Surfactants Detergents, vol. 7, No. 3, 1970, pp. 125-132. https://doi.org/10.1515/tsd-1970-070301. See instant specification, as amended May 7, 2019, paragraph [0045].

English-language translation of the Summary of Tenside Surfactants Detergents (1970), obtained from https://www.bcin.ca/bcin/detail.app?id=34839&lang=en&asq=&csq=&csa=VAN+RAAY%2C+HANS+GEORG&ps=50&pld=1, last accessed on Jan. 20, 2022.

* cited by examiner

SURFACTANT COMPOSITION COMPRISING AN AMYLASE

CROSS-REFERENCE TO RELATED APPLICATION

This application is a U.S. National-Stage entry under 35 U.S.C. § 371 based on International Application No. PCT/EP2017/076855, filed Oct. 20, 2017, which was published under PCT Article 21(2) and which claims priority to German Application No. 10 2016 221 849.2, filed Nov. 8, 2016, which are all hereby incorporated in their entirety by reference.

TECHNICAL FIELD

The present disclosure relates to the field of enzyme technology, in particular optimizing surfactant/enzyme mixtures, as used, for example, in washing or cleaning agents. The present disclosure relates to a liquid surfactant composition containing a surfactant mixture, water, and at least one amylase, as defined herein. The present disclosure further relates to a method for cleaning textiles or hard surfaces using the surfactant composition as contemplated herein.

BACKGROUND

Amylases belong to the technically significant enzymes. Their use for washing and cleaning agents is established in the industry and they can be contained in modern, efficient washing and cleaning agents. Amylases are divided into α-, β-, γ- and isoamylases. Amylases are classified as hydrolase (an enzyme which cleaves hydrolytically) or as glycosidase (an enzyme which cleaves polysaccharides). α-amylases (EC 3.2.1.1) cleave inner α(1-4)-glycoside bonds of the amylose, but not terminal or α(1-6)-glycoside bonds. This produces maltose, maltotriose and branched oligosaccharides. β-amylases (EC 3.2.1.2) cleave a maltose molecule from each chain end in saccharides. γ-amylases (EC 3.2.1.3) cleave a β-D-glucose molecule from each chain end in saccharides. Isoamylases (EC 3.2.1.68) are present only in plants and bacteria and cleave the 1,6-glycosidic branches of glycogen and amylopectin. The amylases used in the washing or cleaning agents known from the prior art are conventionally of microbial origin and are usually from bacteria or fungi, for example of the genera *Bacillus, Pseudomonas, Acinetobacter, Micrococcus, Humicola, Trichoderma* or *Trichosporon*, in particular *Bacillus*. Amylases are conventionally produced by suitable microorganisms in accordance with biotechnological methods that are known per se, for example by transgenic expression hosts of the genus *Bacillus* or by filamentous fungi.

Washing conditions in countries such as the USA are significantly different in comparison with Europe, in particular with regard to temperature and washing time. For example, the washing temperature is significantly lower (wash cycles without heating) and the washing time is significantly reduced (approximately 10 min in comparison with approximately 30 min; only washing time without rinse cycle).

It is a challenge, with short washing times of this kind and comparatively low temperatures, to achieve an optimum washing performance with regard to removing stains and to degree of whiteness. The situation is further complicated in that in other countries, such as the USA, not all ingredients which are conventionally used e.g. in European washing agents, and which contribute to washing performance (such as phosphorus-containing ingredients, in particular P-containing complexing agents such as phosphonates), can be used due to legal regulations.

In addition, it is desirable that the performance of the washing agent remains the same over a long period of time. However, conventional enzymes are inactive depending on storage conditions and on the choice of surfactant, and therefore do not play a role in washing performance.

An optimized combination of surfactant/surfactant mixture and enzyme/enzyme mixture is therefore necessary for optimal stability and cleaning performance of the individual ingredients. Optimal compositions of this kind have to be found individually for each enzyme or enzyme mixture. There is therefore a need for a storage-stable surfactant mixture which is compatible with an amylase and the activity of which is not reduced, or is not reduced significantly, even at high surfactant concentrations, or an amylase which demonstrates improved performance/stability in comparison with reference amylases under conditions of this kind.

BRIEF SUMMARY

Surprisingly, it has now been found that the use of an amylase according to SEQ ID NO:1, after storage in the presence of high surfactant concentrations for multiple weeks, leads to improved washing performance in comparison with a reference amylase.

In an embodiment of the present disclosure, a liquid surfactant composition comprises, based on the total weight of the composition, a) a total amount of from about 2.0 to about 8.0 wt. % $C_9$-$C_{20}$ alkylbenzene sulfonate, and b) a total amount of from about 10.0 to about 18.0 wt. % $R^1$—O—$(CH_2CH_2O)_n$—$SO_3M$, in which $R^1$ represents a $C_{12-18}$ alkyl group, n represents a number from 2 to 3, and M represents a monovalent cation, and c) a total amount of from about 1.0 to about 6.0 wt. % $R^2$—O—$(CH_2CH_2O)_m$—$SO_3M'$, in which $R^2$ represents a $C_{12-18}$ alkyl group, m represents a number from 7 to 8, and M' represents a monovalent cation, and d) a total amount of from about 2.0 to about 10.0 wt. % of a fatty alcohol ethoxylate, and e) water, and f) at least one amylase, wherein the amylase has an amino acid sequence which is at least 75% identical to the amino acid sequence specified in SEQ ID NO:1 over the entire length thereof.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

The present disclosure is therefore directed, in a first aspect, to a liquid surfactant composition containing, based on the total weight of the composition,
a) from about 2.0 to about 8.0 wt. % $C_9$-$C_{20}$ alkylbenzene sulfonate;
b) from about 10.0 to about 18.0 wt. % $R^1$—O—$(CH_2CH_2O)_n$—$SO_3M$, in which $R^1$ represents a $C_{12-18}$ alkyl group, n represents a number from 2 to 3, and M represents a monovalent cation;
c) from about 1.0 to about 6.0 wt. % $R^2$—O—$(CH_2CH_2O)_m$—$SO_3M'$, in which $R^2$ represents a $C_{12-18}$ alkyl group, m represents a number from about 7 to about 8, and M' represents a monovalent cation;

d) a total amount of from about 2.0 to about 10.0 wt. %, preferably from about 2.5 to about 7.5 wt. %, more preferably from about 4.0 to about 6.0 wt. %, fatty alcohol ethoxylate(s);
e) water; and
f) at least one amylase,
the amylase having an amino acid sequence which is at least about 75% identical to the amino acid sequence specified in SEQ ID NO:1 over the entire length thereof.

In a further aspect, the present disclosure is directed to a method for cleaning textiles or hard surfaces, in at least one method step, a liquid surfactant composition as contemplated herein is used.

In yet another aspect, the present disclosure is further directed to the use of a liquid surfactant composition as described herein, preferably a washing or cleaning agent, for removing stains.

Within the meaning of the present disclosure, the definition of a number range which is intended to be "between" two range boundaries does not include the range boundaries, according to general linguistic usage. Number ranges which are defined from one range boundary to another range boundary include the range boundaries.

All the stated quantities from a), b) and c) are calculated with sodium as the counterion or monovalent cation M and M'. If monovalent cations M or M' are used which are different from sodium, the weight quantity must therefore be recalculated in accordance with sodium as the monovalent cation.

"At least one", as used herein, includes, but is not restricted to, 1, 2, 3, 4, 5, 6 and more.

Unless explicitly indicated otherwise, all percentages that are cited in connection with the compositions described herein refer to wt. % with respect to the relevant mixture/composition.

Within the scope of the present disclosure, unless indicated otherwise, fatty acids and/or fatty alcohols and/or the derivatives thereof represent branched or unbranched carboxylic acids and/or alcohols and/or the derivatives thereof having preferably from 6 to 22 carbon atoms. In particular, the oxo alcohols and the derivatives thereof which can be obtained according to Roelen's oxo synthesis, for example, can also be used correspondingly. Where alkaline earth metals are referred to as counterions for monovalent anions in the following, this means that only half as much alkaline earth metal as the anion is naturally present (sufficient for charge equalization).

The composition as contemplated herein is liquid at about 25° C. and about 1013 mbar.

The surfactant composition as contemplated herein contains from about 2.0 to about 8.0 wt. % $C_9$-$C_{20}$ alkylbenzene sulfonate, preferably $C_{10}$-$C_{15}$ alkylbenzene sulfonate, particularly preferably $C_{10}$-$C_{13}$ alkylbenzene sulfonate.

In the alkylbenzene sulfonate surfactants, "alkyl" preferably represents a linear or branched unsubstituted alkyl functional group. Such highly preferred surfactants a) are selected from linear or branched alkylbenzene sulfonates of formula a in which R' and R" together contain from 8 to 19, preferably from 9 to 14, and in particular from 9 to 12, C atoms and $X^+$ represents a monovalent cation, in particular $Na^+$, $K^+$, $HO-CH_2CH_2NH_3^+$, or $(HO-CH_2CH_2)_3NH^+$. A more particularly preferred representative can be described by the formula a-1:

Most preferred is the use of a total amount of from about 2.0 to about 8.0 wt. % $C_{10}$-$C_{13}$ alkylbenzene sulfonate sodium salt. Most preferred of all is the use of a total amount of from about 2.0 to about 8.0 wt. % $C_{12}$ alkylbenzene sulfonate sodium salt.

The liquid surfactant composition as contemplated herein furthermore contains from about 10.0 to about 18.0 wt. % $R^1-O-(CH_2CH_2O)_n-SO_3M$, in which $R^1$ represents a $C_{12-18}$ alkyl group, n represents 2 or 3, and M represents a monovalent cation. In this case, it is a $C_{12}$-$C_{18}$ alkyl sulfate having the monovalent counterion M and 2 or 3 mol ethylene oxide per mol $C_{12}$-$C_{18}$ alkyl group.

Particularly preferably, n represents 2.

Particularly preferably, M represents $Na^+$, $K^+$, $HO-CH_2CH_2NH_3^+$, or $(HO-CH_2CH_2)_3NH^+$, very particularly preferably $Na^+$.

Most preferably, the liquid surfactant composition as contemplated herein contains a total amount of from about 10.0 to about 18.0 wt. % $R^1-O-(CH_2CH_2O)_2-SO_3Na$, in which $R^1$ represents a $C_{12-18}$ alkyl group, in particular dodecyl.

The liquid surfactant composition as contemplated herein further contains from about 1.0 to about 6.0 wt. % $R^2-O-(CH_2CH_2O)_m-SO_3M'$, in which $R^2$ represents a $C_{12-18}$ alkyl group, n represents 7 or 8, and M' represents a monovalent cation. In this case, it is a $C_{12}$-$C_{18}$ alkyl sulfate having the monovalent counterion M and 7 or 8 mol ethylene oxide per mol $C_{12}$-$C_{18}$ alkyl group.

Particularly preferably, m represents 7.

Particularly preferably, M' represents $Na^+$, $K^+$, $HO-CH_2CH_2NH_3^+$, or $(HO-CH_2CH_2)_3NH^+$, very particularly preferably $Na^+$.

Most preferably, the liquid surfactant composition as contemplated herein contains from about 1.0 to about 6.0 wt. % $R^2-O-(CH_2CH_2O)_7-SO_3Na$, in which $R^2$ represents a $C_{12-18}$ alkyl group, in particular dodecyl.

It has proven advantageous for cold-wash performance if the compositions additionally contain soap(s) as the anionic surfactant. Soaps are the water-soluble sodium or potassium salts of saturated or unsaturated fatty acids having from 10 to 20 carbon atoms, of resin acids of rosin (yellow resin soaps), and of naphthenic acids, which are used as solid or half-solid mixtures principally for washing and cleaning purposes. Sodium or potassium salts of saturated and unsaturated fatty acids having from 10 to 20 carbon atoms, in particular having from 12 to 18 carbon atoms, are preferred soaps as contemplated herein. In this case, particularly preferred compositions contain, based on their weight, from about 0.1 to about 15 wt. %, particularly preferably from about 0.2 to about 12.0 wt. %, very particularly preferably from about 0.3 to about 10.0 wt. %, soap(s).

The surfactant composition as contemplated herein further contains from about 2.0 to about 10.0 wt. %, preferably from about 2.5 to about 7.5 wt. %, more preferably from about 4.0 to about 6.0 wt. %, fatty alcohol ethoxylate(s).

Particularly preferably, the compositions contain at least one fatty alcohol ethoxylate of formula $R^3$—O—$(CH_2CH_2O)_o$—H, in which $R^3$ represents a $C_{12-18}$ alkyl group and o represents a number from about 7 to about 8. These surfactants provide high-performing compositions even at low washing temperatures and have excellent stability at low temperatures in the case of liquid preparations.

Very particularly preferred compositions contain, based on the total amount of the compounds, from about 2.0 to about 10 wt. %, preferably from about 2.5 to about 7.5 wt. %, more preferably from about 4.0 to about 6.0 wt. %, fatty alcohol ethoxylate(s) as the nonionic surfactant.

It is preferred as contemplated herein if the weight ratio of surfactant component a) to surfactant component b) in the liquid surfactant composition is from about 1:9 to about 1:2, preferably from about 1:6 to about 1:3, particularly preferably from about 1:5 to about 1:3.

It is preferred as contemplated herein if the weight ratio of surfactant component a) to surfactant component c) in the liquid surfactant composition is from about 2:1 to about 1:2, preferably from about 2:1 to about 1:1, particularly preferably from about 1.5:1 to about 1:1.

It is preferred as contemplated herein if the weight ratio of surfactant component a) to surfactant component d) in the liquid surfactant composition is from about 2:1 to about 1:5, preferably from about 1.5:1 to about 1:3, particularly preferably from about 1:1 to about 1:2.

The composition as contemplated herein contains water as a solvent. In this case, it is preferred as contemplated herein to use water in a total amount of from about 20 to about 80 wt. %, in particular of from about 30 to about 70 wt. %, very particularly preferably of from about 40 to about 60 wt. %, based on the weight of the composition.

In addition to the components which are necessarily present as contemplated herein, organic solvents can be added to the liquid composition as contemplated herein. Organic solvents are liquid, dissolve at about 20° C. by at least about 1 g in about 100 g water, and have at least one covalent bond between carbon and hydrogen in the molecule. It is preferred as contemplated herein to use amino group-free organic solvents in a total amount of from 0 to about 10 wt. %, in particular of from 0 to about 7.5 wt. %, based on the weight of the composition. Suitable amino group-free organic solvents comprise monovalent or polyvalent alcohols or glycol ethers, if they can be mixed with water in the stated concentration range. Preferably, the amino group-free organic solvents are selected from ethanol, n-propanol, i-propanol, butanols, glycol, propanediol, butanediol, methylpropanediol, glycerol, diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol mono methyl ether, dipropylene glycol mono ethyl ether, methoxytriglycol, ethoxytriglycol, butoxytriglycol, 1-butoxyethoxy-2-propanol, 3-methyl-3-methoxybutanol, propylene-glycol-t-butyl-ether, di-n-octylether, and mixtures of two or more of these above-mentioned solvents. However, it is preferred that the composition as contemplated herein optionally contains an amino group-free $C_2$-$C_4$ alcohol having 1 to 3 hydroxyl groups, in particular ethanol and/or glycerol and/or 1,2-propanediol.

The composition as contemplated herein necessarily contains at least one amylase. This amylase is an α-amylase and has an amino acid sequence which is at least about 75% identical to the amino acid sequence specified in SEQ ID NO:1 over the entire length thereof. α-amylases (EC 3.2.1.1) hydrolyze, as an enzyme, internal α-1,4-glycosidic bonds of starch and starch-like polymers.

In different embodiments of the present disclosure, the amylase has an amino acid sequence which is at least about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5%, about 98.8%, about 99.0%, about 99.2%, about 99.4%, about 99.6% or about 99.8%, or about 100.0%, identical to the amino acid sequence specified in SEQ ID NO:1.

The amount of an amylase of this kind is typically from about 0.01 to about 2 wt. %, based on active protein.

In addition to the amylase, the liquid surfactant composition as contemplated herein can further comprise a protease. A protease is an enzyme which cleaves peptide bonds by employing hydrolysis. Each enzyme of the class EC 3.4 falls into this category as contemplated herein (including each of the thirteen subclasses that fall into this category). The EC number corresponds to the enzyme nomenclature 1992 of the NC-IUBMB, Academic Press, San Diego, Calif., including the supplements 1 to 5, published in the European Journal of Biochemistry (Eur. J. Biochem.) 1994, 223, pp. 1-5; Eur. J. Biochem 1995, 232, pp. 1-6; Eur. J. Biochem. 1996, 237, pp. 1-5; Eur. J. Biochem. 1997, 250, pp. 1-6; and Eur. J. Biochem. 1999, 264, pp. 610-650.

Subtilase refers to a subgroup of serine proteases. The serine proteases or serine peptidases are a subgroup of the proteases which have serine in the active site of the enzyme which forms a covalent adduct with the substrate. Furthermore, the subtilases (and the serine proteases) are exemplified in that, in addition to said serine having histidine and aspartame, they have two further amino acid functional groups in the active site. The subtilases can be divided into 6 subclasses, i.e. the subtilisin family, the thermitase family, the proteinase K family, the family of lantibiotic peptidases, the kexin family and the pyrolysin family. The proteases which are preferably excluded as a component of the compositions as contemplated herein or contained preferably in reduced quantities are endopeptidases (EC 3.4.21).

"Protease activity" is present as contemplated herein when the enzyme exhibits proteolytic activity (EC 3.4). Various types of protease activity are known. The three main types are: trypsin-like, where the amide substrate is cleaved after the amino acids Arg or Lys at P1; chymotrypsin-like, where cleaving takes place after one of the hydrophobic amino acids at P1; and elastase-like, where the amide substrate is cleaved after Ala at P1.

The protease activity can be detected in accordance with the method described in *Tenside*, volume 7 (1970), pages 125-132. Accordingly, they are specified in protease units. The protease activity of an enzyme can be tested according to conventional standard methods, such as by using BSA as a substrate (bovine albumin) and/or using the AAPF method.

Surprisingly, it has been found that a protease of the type of alkaline protease of *Bacillus lentus* DSM 5483 or a sufficiently similar protease thereto (based on sequence identity), which has a plurality of these changes in combination, is particularly suitable for use in the liquid surfactant composition as contemplated herein and is advantageously better stabilized therein. Advantages of using this protease can be seen in particular with regard to washing performance and/or stability.

A particularly preferred embodiment of the present disclosure is said liquid surfactant composition, containing, as an enzyme, an amylase as defined above and at least one protease having an amino acid sequence which is at least about 70% identical to the amino acid sequence specified in SEQ ID NO:2 over the entire length thereof and having, in the listing according to SEQ ID NO:2, the amino acid substitution R99E or R99D in combination with at least two further amino acid substitutions which are selected from the group of S3T, V4I, or V199I. Said protease is described in WO 2013/060621, as well as the method for producing said protease, comprising introducing an amino acid substitution R99E or R99D in combination with at least two further amino acid substitutions, which are selected from the group of S3T, V4I, or V199I, in the listing according to SEQ ID NO:2, into a starting protease that is at least about 70% identical to the amino acid sequence specified in SEQ ID NO:2 over the entire length thereof.

A further particularly preferred embodiment of the present disclosure is said liquid surfactant composition, containing, as an enzyme, an amylase as defined above and at least one protease having an amino acid sequence which is at least about 70% identical to the amino acid sequence specified in SEQ ID NO:2 over the entire length thereof and having, in the listing according to SEQ ID NO:2, the amino acid substitution R99E in combination with at least one further amino acid substitution at the positions 154 and 256. The substitutions S154D and L256E are particularly preferred in this case, a particularly preferred protease having the amino acid sequence according to SEQ ID NO:2, which additionally comprises the amino acid substitutions R99E in combination with the substitutions S154D and L256E. Other particularly preferred proteases for use in the liquid surfactant composition as contemplated herein are disclosed in WO2016/096714.

A preferred protease within the meaning of the present application comprises both the protease per se and a protease produced using a method as contemplated herein. All comments on the protease therefore relate both to the protease as a substance and to the corresponding methods, in particular methods of producing the protease.

As further subjects of the present disclosure, washing and cleaning methods are associated with the proteases preferred as contemplated herein or the preparation methods for proteases as contemplated herein, for the nucleic acids coding for said proteases, non-human host cells containing proteases as contemplated herein or nucleic acids, and liquid surfactant compositions comprising proteases as contemplated herein.

A change as contemplated herein of the position 99, i.e. a change R99E or R99D, in conjunction with a change to at least two of the positions 3, 4 and 199, i.e. S3T, V4I or V199I, in a protease having an amino acid sequence which is at least about 70% identical to the amino acid sequence specified in SEQ ID NO:2 preferably leads to improved cleaning performance of said changed protease in the washing and cleaning agents against at least one protease-sensitive stain.

A change as contemplated herein of the position 99, i.e. a change R99E, in connection with a change to at least one of the positions 154 and 256 (the substitutions S154D and L256E in this case are particularly preferred in this case) in a protease which has an amino acid sequence which is at least about 70% identical to the amino acid sequence specified in SEQ ID NO:2, preferably leads to improved cleaning performance of said changed protease in washing and cleaning agents against at least one protease-sensitive stain.

This applies to the liquid surfactant composition as contemplated herein, in particular during use at low temperatures of up to about 10° C. Proteases as contemplated herein consequently allow improved removal of at least one, preferably of a plurality of protease-sensitive stains on textiles and/or hard surfaces, for example dishes.

Preferred embodiments of proteases as contemplated herein demonstrate particularly advantageous cleaning performance against bloody stains, for example against blood stains on cotton: product no. 111, obtainable from Eidgenössische Material-und Prüfanstalt (EMPA) Testmaterialien AG, St. Gallen, Switzerland; milk/carbon black on cotton (wfk—Cleaning Technology Institute e.V., Krefeld, Germany); blood/milk/ink on cotton: product no. C-05, obtainable from CFT (Center For Testmaterials) B.V. Vlaardingen, the Netherlands.

Preferred embodiments of said surfactant compositions having said amylase and optionally preferred dirt-specific protease achieve the advantageous cleaning performances at low temperatures between about 10° C. and about 60° C., between about 15° C. and about 50° C., and between about 20° C. and about 40° C. Particularly preferred embodiments of said surfactant compositions having said amylase and optionally preferred dirt-specific protease are provided in the following, the cleaning performance of which is advantageous specifically with regard to a stain or to a plurality of stains of similar types, in particular at temperatures of at most 25° C., particularly preferably at temperatures of at most 20° C.

Furthermore, preferred embodiments of the amylase used in the surfactant composition as contemplated herein have a particular stability in washing or cleaning agents, for example against surfactants and/or bleaching agents and/or against temperature influences, in particular against high temperatures, for example between about 50 and about 65° C., in particular about 60° C., and/or against acidic or alkaline conditions and/or against pH changes and/or against denaturizing or oxidizing agents and/or against proteolytic degradation and/or against a change to the redox ratios. Advantageous embodiments of this kind of amylases as contemplated herein therefore allow improved washing results against amylase-sensitive stains in a broad temperature range.

Within the scope of the present disclosure, "cleaning performance" is understood to mean the brightening performance against one or more stains, in particular on laundry or dishes. Within the scope of the present disclosure, both the washing or cleaning agent comprising the amylase, or the washing or cleaning liquor formed by said agent, and the amylase itself each exhibit their own cleaning performance. The cleaning performance of the enzyme therefore contributes to the cleaning performance of the agent or to the washing or cleaning liquor formed by the agent. The cleaning performance is preferably ascertained as specified further below.

In a further embodiment of the present disclosure, the protease has an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5% or about 98.8% identical to the amino acid sequence specified in SEQ ID NO:2 over the entire length thereof, and has, in the listing according to SEQ ID NO:2, the amino acid substitution R99E in combination with at least two further amino acid substitutions which are selected from the group of S3T, V4I, or V199I.

In a further embodiment of the present disclosure, the protease has an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5% or about 98.8% identical to the amino acid sequence specified in SEQ ID NO:2 over the entire length thereof, and has, in the listing according to SEQ ID NO:2, the amino acid substitution R99D in combination with at least two further amino acid substitutions which are selected from the group of S3T, V4I, or V199I.

In a further embodiment of the present disclosure, the protease has an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5% or about 98.8% identical to the amino acid sequence specified in SEQ ID NO:2 over the entire length thereof, and has, in the listing according to SEQ ID NO:2, the amino acid substitution R99E in combination with at least two further amino acid substitutions at the positions 154 and 256. The substitutions S154D and L256E are particularly preferred in this case.

Proteases which are particularly preferred as contemplated herein are:

A protease having an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5% or about 98.8% identical to the amino acid sequence specified in SEQ ID NO:2 over the entire length thereof, and having, in the listing according to SEQ ID NO:2, the amino acid substitution R99E in combination with at least one further amino acid substitution at the positions 154 and 256.

A protease having an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5% or about 98.8% identical to the amino acid sequence specified in SEQ ID NO:2 over the entire length thereof, and having, in the listing according to SEQ ID NO:2, the amino acid substitution R99E in combination with S154D and a further amino acid substitution at the position 256, preferably L256E.

A protease having an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5% or about 98.8% identical to the amino acid sequence specified in SEQ ID NO:2 over the entire length thereof, and having, in the listing according to SEQ ID NO:2, the amino acid substitution R99E in combination with L256E and a further amino acid substitution at the position 154, preferably S154D.

A protease having an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5% or about 98.8% identical to the amino acid sequence specified in SEQ ID NO:2 over the entire length thereof, and having, in the listing according to SEQ ID NO:2, the amino acid substitution R99E in combination with the amino acid substitutions S3T and V4I, in particular a protease according to SEQ ID NO:2 having the amino acid substitutions S3T, V4I and R99E.

A protease having an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5% or about 98.8% identical to the amino acid sequence specified in SEQ ID NO:2 over the entire length thereof, and having, in the listing according to SEQ ID NO:2, the amino acid substitution R99E in combination with the amino acid substitutions S3T and V199I, in particular a protease according to SEQ ID NO:2 having the amino acid substitutions S3T, R99E and V199I.

A protease having an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5% or about 98.8% identical to the amino acid sequence specified in SEQ ID NO:2 over the entire length thereof, and having, in the listing according to SEQ ID NO:2, the amino acid substitution R99E in combination with the amino acid substitutions V4I and V199I, in particular a protease according to SEQ ID NO:2 having the amino acid substitutions V4I, R99E and V199I.

A protease having an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5% or about 98.8% identical to the amino acid sequence specified in SEQ ID NO:2 over the entire length thereof, and having, in the listing according to SEQ ID NO:2, the amino acid substitution R99D in combination with the amino acid substitutions S3T and V4I, in particular a protease according to SEQ ID NO:2 having the amino acid substitutions S3T, V4I and R99D.

A protease having an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5% or about 98.8% identical to the amino acid sequence specified in SEQ ID NO:2 over the entire length thereof, and having, in the listing according to SEQ ID NO:2, the amino acid substitution R99D in combination with the amino acid substitutions S3T and V199I, in particular a protease according to SEQ ID NO:2 having the amino acid substitutions S3T, R99D and V199I.

A protease having an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5% or about 98.8% identical to the amino acid sequence specified in SEQ ID NO:2 over the entire length thereof, and having, in the listing according to SEQ ID NO:2, the amino acid substitution R99D in combination with the amino acid substitutions V4I and V199I, in particular a protease according to SEQ ID NO:2 having the amino acid substitutions V4I, R99D and V199I.

Further particularly preferred embodiments of proteases as contemplated herein have the amino acid substitution R99E or R99D in combination with the three additional amino acid substitutions S3T, V4I and V199I. In particular, the following proteases are very particularly preferred in this regard:

A protease having an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98% or about 98.5% identical to the amino acid sequence specified in SEQ ID NO:2 over the entire length thereof, and having, in the listing according to SEQ ID NO:2, the amino acid substitution R99E in combination with the amino acid substitutions S3T, V4I and V199I, in particular a protease according to SEQ ID NO:2 having the amino acid substitutions S3T, V4I, R99E and V199I.

A protease having an amino acid sequence which is at least about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98% or about 98.5% identical to the amino acid sequence specified in SEQ ID NO:2 over the entire length thereof, and having, in the listing according to SEQ ID NO:2, the amino acid substitution R99D in combination with the amino acid substitutions S3T, V4I and V199I, in particular a protease according to SEQ ID NO:2 having the amino acid substitutions S3T, V4I, R99D and V199I.

Other particularly preferred proteases are proteases as described above, which further comprise the amino acid leucine (L) at position 211 in the listing according to SEQ ID NO:2.

The amount of a protease of this kind is typically from about 0.01 to about 2 wt. %, based on active protein.

Whether the nucleic acid or amino acid sequences are identical is determined by employing sequence comparison. This sequence comparison is based on the BLAST algorithm, which is established in the prior art and is conventionally used (cf., for example, Altschul, S. F., Gish, W., Miller, W., Myers, E. W. & Lipman, D. J. (1990) "Basic local alignment search tool." J. Mol. Biol. 215:403-410, and Altschul, Stephan F., Thomas L. Madden, Alejandro A. Schaffer, Jinghui Zhang, Hheng Zhang, Webb Miller, and David J. Lipman (1997): "Gapped BLAST and PSI-BLAST: a new generation of protein database search programs"; Nucleic Acids Res., 25, S.3389-3402) and occurs, in principle, in that similar sequences of nucleotides or amino acids in the nucleic acid or amino acid sequences are correlated with one another. A tabular correlation of the relevant positions is referred to as alignment. Another algorithm which is available in the prior art is the FASTA algorithm. Sequence comparisons (alignments), in particular multiple sequence comparisons, are produced using computer programs. The Clustal series (cf. e.g. Chenna et al. (2003): Multiple sequence alignment with the Clustal series of programs. Nucleic Acid Research 31, pp. 3497-3500), T-Coffee (cf. e.g. Notredame et al. (2000): T-Coffee: A novel method for multiple sequence alignments. J. Mol. Biol. 302, pp. 205-217), or programs which are based on these programs or algorithms, are commonly used, for example. In the present patent application, all the sequence comparisons (alignments) are produced by employing the computer program Vector NTI® Suite 10.3 (Invitrogen Corporation, 1600 Faraday Avenue, Carlsbad, Calif., USA) using the predetermined standard parameters, the AlignX module of which is based on ClustalW for the sequence comparisons.

Such a comparison makes it possible to draw a conclusion as to the similarity of the compared sequences to one another. This similarity is usually given in percentage identity, i.e. the proportion of the identical nucleotides or amino acid functional groups at the same positions or at positions corresponding to one another in an alignment. The broader concept of homology takes into consideration, in the case of amino acid sequences, preserved amino acid exchanges, i.e. amino acids having similar chemical activity, as these amino acids usually exhibit similar chemical activity within the protein. The similarity of the compared sequences can therefore also be indicated as percentage homology or percentage similarity. Identity and/or homology information can be provided regarding whole polypeptides or genes or only regarding individual regions. Homologous or identical regions of different nucleic acid or amino acid sequences are therefore defined by matches in the sequences. Regions of this kind often have identical functions. They can be small and comprise only a few nucleotides or amino acids. Often, small regions of this kind carry out functions that are essential to the overall activity of the protein. It may therefore be expedient to apply sequence matches only to individual, optionally small regions. Unless indicated otherwise, data relating to identity or homology in the present disclosure relates, however, to the total length of the nucleic acid or amino acid sequence specified in each case.

In a very particularly preferred embodiment of the present disclosure, the protease cleaning performance corresponds at least to the protease which has an amino acid sequence that corresponds to the amino acid sequence specified in SEQ ID NO:2, the cleaning performance being determined in a washing system which contains a washing agent in a dosage between about 4.5 and about 7.0 grams per liter of washing liquor and the protease, the proteases to be compared being used at identical concentrations (based on active protein) and the cleaning performance against a blood stain on cotton, in particular against the stain "blood on cotton": product no. 111, obtainable from Eidgenossische Material- und Prüfanstalt (EMPA) Testmaterialien AG, St. Gallen, Switzerland, determined by measuring the degree of whiteness of the washed textiles, the washing process being carried out for about 70 minutes at a temperature of about 40° C. and the water having a water hardness between about 15.5 and about 16.5° (German hardness). The concentration of the protease in the washing agent specified for this washing system is from about 0.001 to about 0.1 wt. %, preferably from about 0.01 to about 0.06 wt. %, based on active protein.

In addition to the amino acid changes explained above, amylases and proteases as contemplated herein can be subjected to further amino acid changes, in particular amino acid substitutions, insertions or deletions. Amylases and proteases of this kind are developed further, for example, by deliberate genetic modification, i.e. using mutagenesis methods, and optimized for specific usage purposes or with regard to certain properties (e.g. with regard to their catalytic activity, stability, etc.). Furthermore, nucleic acids as contemplated herein can be introduced into recombination preparations and therefore used to produce completely new amylases and proteases or other polypeptides.

The aim is to introduce specific mutations, such as substitutions, insertions or deletions, into the known molecule, in order to improve the cleaning power of enzymes as contemplated herein, for example. For this purpose, in particular the surface charges and/or the isoelectric point of the molecule, and thereby the interactions thereof with the substrate, can be changed. The net charge of the enzyme can therefore be changed, for example, in order to influence substrate binding in particular for use in washing and cleaning agents. Alternatively or additionally, the stability of the amylase or protease can be increased by one or more appropriate mutations and the cleaning performance of said amylase or protease can therefore be improved. Advantageous properties of individual mutations, e.g. of individual substitutions, can complement one another. An amylase or protease that has already been optimized with regard to specific properties, for example with regard to its stability against surfactants and/or bleaching agents and/or other components, can therefore also be further developed within the meaning of the present disclosure.

For the description of substitutions which relate precisely to an amino acid position (amino acid exchanges), the following convention is used: first, the naturally present amino acid is referred to by the internationally used one-letter code, then the corresponding sequence position, and finally the inserted amino acid. A plurality of exchanges inside said polypeptide chains are separated from one another by forward slashes. In insertions, additional amino acids are named according to the sequence position. In deletions, the absent amino acid is replaced by a symbol, for example an asterisk or a slash. For example, A95G describes the substitution of alanine at position 95 by glycine, A95AG describes the insertion of glycine after the amino acid alanine at position 95, and A95* describes the deletion of alanine at position 95. This nomenclature is known to a person skilled in the art in the field of enzyme technology.

The present disclosure further relates to a washing and cleaning agent containing a combination of an α-amylase and a protease, the α-amylase or protease can be obtained from an amylase or protease, respectively, as contemplated herein as a starter molecule by employing single or multiple conservative amino acid substitution. The term "conservative amino acid substitution" means an exchange (substitution) of an amino acid functional group with another amino acid functional group, although this exchange does not lead to a change in the polarity or charge at the position of the exchanged amino acid, e.g. the exchange of a non-polar amino acid functional group with another non-polar amino acid functional group. Conservative amino acid substitutions within the context of the present disclosure include, for example: G=A=S, I=V=L=M, D=E, N=Q, K=R, Y=F, S=T, G=A=I=V=L=M=Y=F=W=P=S=T.

The present disclosure further relates to a washing and cleaning agent containing a combination of an α-amylase and a protease, the α-amylase can be obtained as a starter molecule from an amylase as contemplated herein by employing fragmentation or fusion, deletion, insertion or substitution mutagenesis, and has an amino acid sequence which matches the starter molecule over a length of at least 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 475, 476, 477, 478, 479, 480 or 481 interconnected amino acids. Analogously, the protease can also be obtained from a protease as contemplated herein as a starter molecule by employing fragmentation or fusion, deletion, insertion or substitution mutagenesis, and has an amino acid sequence which matches the starter molecule over a length of at least 50, 60, 70, 80, 90, 100, 110, 120, 130, 140, 150, 160, 170, 180, 190, 200, 210, 220, 230, 240, 250, 260, 262, 264, 265, 266, 267 or 268 interconnected amino acids.

It is therefore possible, for example, to delete individual amino acids at the termini or in the loops of the enzyme, without the enzymatic activity being lost or reduced as a result. Furthermore, fragmenting, deletion mutagenesis, insertion mutagenesis or substitution mutagenesis of this kind can reduce the allergenicity of relevant enzymes and therefore improve their usability overall. Advantageously, the enzymes retain their enzymatic activity even after mutagenesis, i.e. their enzymatic activity corresponds at least to that of the starting enzyme. Substitutions can also demonstrate advantageous effects. Both single and multiple contiguous amino acids can be exchanged for other amino acids.

An enzyme as contemplated herein can also be stabilized in particular by employing one or more mutations, for example substitutions, or by coupling to a polymer. This is because increasing the stability in storage and/or during use, for example in the washing process, leads to the enzymatic activity lasting for longer and the cleaning performance thus being improved. In principle, all the stabilization options which are described in the prior art and/or are expedient are taken into consideration. Stabilizations are preferred which are achieved by mutation of the enzyme itself, as such stabilizations do not require any further working steps in addition to extracting the enzyme. Sequence changes that are suitable for this purpose are known from the prior art.

Further options for stabilization are e.g.:
changing the binding of metal ions, in particular the calcium binding site, for example by exchanging one or more of the amino acid(s) involved in calcium binding with one or more negatively charged amino acids and/or by introducing sequence changes to at least one of the sequences of the two amino acids arginine/glycine;
protecting against the influence of denaturing agents such as surfactants by employing mutations which change the amino acid sequence on or at the surface of the protein; and
exchanging amino acids which are near the N-terminus with amino acids that are presumed to be in contact with the rest of the molecule via non-covalent interactions and therefore contribute to maintaining the globular structure.

Preferred embodiments are those in which the enzyme is stabilized in a variety of ways, as a plurality of stabilizing mutations have an additive or synergistic effect.

The present disclosure also relates to an enzyme as described above, which has at least one chemical change. An enzyme undergoing a change of this kind is referred to as a derivative, i.e. the enzyme is derivatized.

Within the context of the present disclosure, derivatives are understood to mean proteins of which the pure amino acid chain has been chemically modified. Derivatizations of this kind can be carried out in vivo, for example, by the host cell that expresses the protein. In this regard, couplings of low-molecular-weight compounds such as of lipids or oligosaccharides are particularly noteworthy. However, the derivatizations may also be carried out in vitro, for example by the chemical conversion of a side chain of an amino acid or by covalent bonding of another compound to the protein. For example, it is possible to couple amines to carboxyl groups of an enzyme in order to change the isoelectric point. Another compound of this kind can also be another protein which is bound to a protein as contemplated herein via bifunctional chemical compounds, for example. Derivatization is likewise understood to mean covalent bonding to a macromolecular carrier, or non-covalent entrapment in suitable macromolecular cage structures. Derivatizations can, for example, influence the substrate specificity or the strength of the binding to the substrate or lead to temporary blocking of the enzymatic activity, if the coupled substance is an inhibitor. This may be expedient for the period of storage, for example. Modifications of this kind can furthermore influence stability or enzymatic activity. They can also be used to reduce the allergenicity and/or immunogenicity of the protein and thereby increase the skin compatibility thereof. For example, couplings with macromolecular compounds, such as polyethylene glycol, can improve the protein with regard to stability and/or skin compatibility.

Derivatives of a protein as contemplated herein can be understood, in the broadest sense, to also mean preparations of said protein. Depending on its extraction, processing or preparation, a protein can be associated with various other substances, for example from the culture of the producing microorganisms. A protein can also be specifically combined with other substances, for example in order to increase its storage stability. All the preparations of a protein as contemplated herein are therefore also as contemplated herein. This is also irrespective of whether or not said protein actually develops this enzymatic activity in a specific preparation, as it may be desirable that it has no or only minimal activity in storage, and develops its enzymatic function only at the point of use. This can be controlled by corresponding accompanying substances, for example.

In general, the enzymes contained in a composition as contemplated herein can be adsorbed on carrier substances and/or embedded in coating substances in order to protect said enzymes from premature inactivation.

The obtained enzymes can be added to compositions as contemplated herein in any form established according to the prior art. These forms include in particular the solid preparations obtained by granulation, extrusion or lyophilization, advantageously as concentrated as possible, dry and/or mixed with stabilizers. In an alternative form of administration, the enzymes can also be encapsulated, for example through spray-drying or extrusion of the enzyme solution together with a preferably natural polymer or in the form of capsules, for example those in which the enzymes are enclosed in a set gel, or in those of the core-shell type in which an enzyme-containing core is coated with a water-, air-, and/or chemical-impermeable protective layer. In the case of overlaid layers, other active ingredients, such as stabilizers, emulsifiers, pigments, bleaching agents, or dyes, can be additionally applied. Such capsules are applied using inherently known methods, for example through shaking or roll granulation or in fluidized bed processes. Such granulates are advantageously low in dust, for example due to the application of polymeric film-formers, and stable in storage due to the coating.

The liquid surfactant compositions preferably additionally contain at least one cellulase. A cellulase is an enzyme. Synonymous terms can be used for cellulases, in particular endoglucanase, endo-1,4-beta-glucanase, carboxymethyl cellulase, endo-1,4-beta-D-glucanase, beta-1,4-glucanase, beta-1,4-endoglucanhydrolase, celludextrinase or avicelase. The capacity of an enzyme for hydrolysis of 1,4-β-D-glucosidic bonds in cellulose is crucial to whether said enzyme is a cellulase within the meaning of the present disclosure.

Cellulases which can be produced as contemplated herein (endoglucanases, EG) include, for example, the fungal endoglucanase (EG)-rich cellulase preparation or the developments thereof, which are provided by Novozymes under the trade name Celluzyme®. The products Endolase® and Carezyme®, which are also available from Novozymes, are based on the 50 kD EG and the 43 kD EG, respectively, of *Humicola insolens* DSM 1800. Other commercial products from this company that can be used are Cellusoft®, Renozyme® and Celluclean®. It is also possible to use cellulases, for example, which can be obtained from AB Enzymes, Finland, under the trade names Ecostone® and Biotouch®, and which are based at least in part on the 20 kD EG of *Melanocarpus*. Further cellulases from AB Enzymes are Econase® and Ecopulp®. Other suitable cellulases are from *Bacillus* sp. CBS 670.93 and CBS 669.93, the cellulase from *Bacillus* sp. CBS 670.93 being available from Danisco/

Genencor under the trade name Puradax®. Other usable commercial products from Danisco/Genencor are "Genencor detergent cellulase L" and IndiAge® Neutra.

Variants of these enzymes which are obtained by employing point mutation can also be used as contemplated herein. Particularly preferred cellulases are *Thielavia terrestris* cellulase variants, which are disclosed in the international laid-open application WO 98/12307, cellulases from *Melanocarpus*, in particular *Melanocarpus albomyces*, which are disclosed in the international laid-open application WO 97/14804, EGIII-type cellulases from *Trichoderma reesei*, which are disclosed in European patent application EP 1 305 432, and/or variants that can be obtained therefrom, in particular those which are disclosed in European patent applications EP 1240525 and EP 1305432, and cellulases which are disclosed in the international laid-open applications WO 1992006165, WO 96/29397 and WO 02/099091. Reference is therefore explicitly made to each of the disclosures of these applications, or the disclosure of these applications in this regard is therefore explicitly included in the present application.

Compositions which are particularly preferred as contemplated herein are exemplified in that at least one cellulase of a 20K cellulase that can be obtained from *Melanocarpus* sp. or *Myriococcum* sp. or of a cellulase that has a homology thereto of more than 80% (in order of increasing preference, of more than about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5%, about 99.0%, about 99.1%, about 99.2%, about 99.3%, about 99.4%, about 99.5%, about 99.6%, about 99.7%, about 99.8% or about 99.9%) as an additional cellulase.

The 20K cellulase that can be obtained from *Melanocarpus* sp. or *Myriococcum* sp. is known from the international application WO 97/14804. Said cellulase has, as described therein, a molecular weight of approximately 20 kilodaltons and exhibits at least about 80% of its maximum activity at about 50° C. in the pH range of from about 4 to about 9, almost about 50% of the maximum activity still being maintained at pH of about 10. Said cellulase can, as also described therein, be isolated from *Melanocarpus albomyces* and produced in genetically manufactured *Trichoderma reesei* transformants. Within the meaning of the present disclosure, cellulases which have a homology of over about 80% (in order of increasing preference, of more than about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5%, about 99.0%, about 99.1%, about 99.2%, about 99.3%, about 99.4%, about 99.5%, about 99.6%, about 99.7%, about 99.8% or about 99.9%) to the 20 K-cellulase can also be used.

K20-cellulase is preferably used in amounts such that a composition as contemplated herein has a cellulolytic activity of from about 1 NCU/g to about 500 NCU/g (which can be determined by hydrolyzing about 1 wt. % carboxymethyl cellulose at about 50° C. and a neutral pH and determining the reducing sugar released in the process by employing dinitrosalicylic acid, as described by M. J. Bailey et al. in Enzyme Microb. Technol. 3: 153 (1981); 1 NCU defines the enzyme amount, the reducing sugar in an amount which corresponds to 1 nmol glucose per second), in particular of from about 2 NCU/g to about 400 NCU/g and particularly preferably of from about 6 NCU/g to about 200 NCU/g. In addition, the composition as contemplated herein may also contain even more cellulases.

A composition as contemplated herein preferably contains from about 0.001 mg to about 0.5 mg, in particular from about 0.02 mg to about 0.3 mg, of cellulolytic protein per gram of the total composition. The protein concentration can be determined using known methods, for example the bicinchoninic acid method (BCA method, Pierce Chemical Co., Rockford, Ill.) or the Biuret method (A. G. Gornall, C. S. Bardawill and M. M. David, J. Biol. Chem. 177, pp. 751-766, 1948).

In turn, it is particularly preferred as contemplated herein to use, in addition to at least one first cellulase of a 20K-cellulase that can be obtained from *Melanocarpus* sp. or *Myriococcum* sp. or of a cellulase that has a homology thereto of more than 80% (in order of increasing preference, of more than about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5%, about 99.0%, about 99.1%, about 99.2%, about 99.3%, about 99.4%, about 99.5%, about 99.6%, about 99.7%, about 99.8% or about 99.9%), at least one further second cellulase which differs from the first cellulase.

It is preferred as contemplated herein if the liquid surfactant compositions as contemplated herein also contain at least one lipase. Lipase enzymes which are preferred as contemplated herein are selected from at least one enzyme of the group form of triacylglycerol lipase (EC 3.1.1.3) and lipoprotein lipase (EC 3.1.1.34) and monoglyceride lipase (EC 3.1.1.23).

The area of application which is preferred as contemplated herein of the compositions as contemplated herein is cleaning textiles. Because washing and cleaning agents for textiles predominantly have alkaline pH values, in particular lipases which are active in the alkaline medium are used for this purpose.

Furthermore, the lipase which is preferably contained in the composition as contemplated herein is naturally present in a microorganism of the type *Thermomyces lanuginosus* or *Rhizopus oryzae* or *Mucor javanicus* or is derived from above-mentioned naturally present lipases by employing mutagenesis. Particularly preferably, the compositions as contemplated herein contain at least one lipase which is naturally present in a microorganism of the type *Thermomyces lanuginosus* or is derived, by employing mutagenesis, from above-mentioned lipases which are naturally present in *Thermomyces lanuginosus*.

Of course, "present" means in this context that the lipase is an inherent enzyme of the microorganism. The lipase can therefore be expressed in the microorganism by a nucleic acid sequence which is part of the chromosomal DNA of the microorganism in its wild-type form. Said lipase or the nucleic acid sequence coding therefor is therefore present in the wild-type form and/or can be isolated from the wild-type form of the microorganism therefrom. In contrast thereto, a lipase which is not naturally present in the microorganism or the nucleic acid sequence coding therefor would have been specifically introduced into the microorganism by employing genetic methods, such that the microorganism would have been enriched by the lipase or by the nucleic acid sequence coding therefor. However, a lipase which is naturally present in a microorganism of the type *Thermomyces*

*lanuginosus* or *Rhizopus oryzae* or *Mucor javanicus* can be produced from another organism by recombination.

The fungus *Thermomyces lanuginosus* (also known as *Humicola lanuginosa*) belongs to the class Eurotiomycetes (subclass Eurotiomycetidae), herein to the order Eurotiales, and herein to the family Trichocomaceae and the genus *Thermomyces*. The fungus *Rhizopus oryzae* belongs to the class Zygomycetes (subclass Incertae sedis), herein to the order Mucorales and herein in turn to the family Mucoraceae and the genus *Rhizopus*. The fungus *Mucor javanicus* also belongs to the class Zygomycetes (subclass Incertae sedis), herein to the order Mucorales and herein in turn to the family Mucoraceae, herein to the genus *Mucor*. The terms *Thermomyces lanuginosis, Rhizopus oryzae* and *Mucor javanicus* are the biological species names within the respective genera.

Lipases which are preferred as contemplated herein are the lipase enzymes which can be obtained from Amano Pharmaceuticals under the names Lipase M-AP10®, Lipase LE® and Lipase F® (also Lipase JV®). Lipase F® is naturally present in *Rhizopus oryzae*, for example. Lipase M-AP10® is naturally present in *Mucor javanicus*, for example.

Compositions of a very particularly preferred embodiment of the present disclosure contain at least one lipase which is selected from at least one or more polypeptides having an amino acid sequence which is at least about 90% (and, in order of increasing preference, at least about 81%, about 82%, about 83%, about 84%, about 85%, about 86%, about 87%, about 88%, about 89%, about 90%, about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5%, about 99.0%, about 99.1%, about 99.2%, about 99.3%, about 99.4%, about 99.5%, about 99.6%, about 99.7%, about 99.8% or about 99.9%) identical to the wild-type lipase from the strain DSM 4109 *Thermomyces lanuginosus*. In this case, it is again preferred if, proceeding from said wild-type lipase of the strain DSM 4109, at least the amino acid change N233R is present.

Within the framework of a further embodiment, in particular such lipases which are derived from the wild-type lipase of the strain DSM 4109 can be preferably used as contemplated herein, which lipases are selected from at least one lipase enzyme according to at least one of claims 1 to 13 of WO 00/60063 A1. The entire disclosure of WO 00/60063 A1 is explicitly included by reference.

Particularly preferable, at least one lipase is used in the compositions of the present disclosure, which lipase is derived from the wild-type lipase of the strain DSM 4109 and in which, proceeding from said wild-type lipase, at least one substitution of an electrically neutrally or negatively charged amino acid is carried out by a positively charged amino acid. The charge is determined in water at pH 10. Negative amino acids within the meaning of the present disclosure are E, D, Y and C. Positively charged amino acids within the meaning of the present disclosure are R, K and H, in particular R and K. Neutral amino acids within the meaning of the present disclosure are G, A, V, L, I, P, F, W, S, T, M, N, Q and C, when C forms a disulfide bridge.

Within the context of this embodiment of the present disclosure, it is again preferred if, proceeding from the wild-type lipase of the strain DSM 4109, at least one of the following amino acid exchanges is present in the positions D96L, T213R and/or N233R, particularly preferably T213R and N233R.

A highly preferred lipase is commercially available under the trade name Lipex® from Novozymes (Denmark) and advantageously can be used in the cleaning compositions as contemplated herein. In this case, the lipase Lipex® 100 L (from Novozymes A/S, Denmark) is particularly preferred. Preferred compositions, based on the total weight of the composition, said lipase enzyme of Lipex® 100 L is contained in a total amount of from about 0.01 to about 1.0 wt. %, in particular from about 0.02 to about 0.3 wt. %.

The compositions as contemplated herein may also contain at least one mannanase as the enzyme. A mannanase contained in the composition as contemplated herein (in particular in a washing and cleaning agent for textiles which is preferred as contemplated herein) catalyzes, as part of its mannanase activity, the hydrolysis of 1,4-beta-D-mannosidic bonds in mannans, galactomannans, glucomannans and galactoglucomannans. Said mannanase enzyme as contemplated herein is classified as EC 3.2.1.78 according to enzyme nomenclature.

The mannanase activity of a polypeptide or of an enzyme can be determined in accordance with test methods that are known in the literature. In this case, a test solution is introduced into holes, having a diameter of about 4 mm, of an agar plate, containing about 0.2 wt. % AZGL galactomannan (carob), i.e. substrate for the endo-1,4-beta-D-mannanase assay, obtainable under catalogue number I-AZGMA from Megazyme (http://www.megazyme.com).

Suitable compositions as contemplated herein contain, for example, the mannanase that is marketed by Novozymes under the name Mannaway®.

Mannanase enzymes were identified in numerous *Bacillus* organisms:

WO 99/64619 discloses examples of liquid, protease-containing washing agent compositions having a high total surfactant content of at least about 20 wt. % and also comprising a mannanase enzyme.

Preferably, the compositions as contemplated herein contain mannanase in a total amount of from about 0.01 to about 1.0 wt. %, in particular of from about 0.02 to about 0.3 wt. %, based on the total weight of the composition.

Mannanase polypeptides of strains of the group *Thermoanaerobacter*, such as Caldicellulosiruptor, are particularly suitable as contemplated herein. Mannanase polypeptides of the fungi *Humicola* or *Scytalidium*, in particular of the species *Humicola insolens* or *Scytalidium thermophilum*, can also be used within the context of the present disclosure.

It is particularly preferred as contemplated herein if the compositions as contemplated herein contain, as a mannanase enzyme, at least one mannanase polypeptide from gram-positive alkalophile strains of *Bacillus*, in particular selected from at least one representative of the group of *Bacillus subtilis, Bacillus lentus, Bacillus clausii, Bacillus agaradhaerens, Bacillus brevis, Bacillus stearothermophilus, Bacillus alkalophilus, Bacillus amyloliquefaciens, Bacillus coagulans, Bacillus circulars, Bacillus lautus, Bacillus thuringiensis, Bacillus cheniformis*, or *Bacillus* sp., particularly preferably selected from at least one representative of the group of *Bacillus* sp. 1633, *Bacillus* sp. AAI12, *Bacillus clausii, Bacillus agaradhaerens* or *Bacillus licheniformus*.

In this case, it is again preferred if said preferred mannanase is contained in a total amount of from about 0.01 to about 1.0 wt. %, in particular of from about 0.02 to about 0.3 wt. %, based in each case on the total weight of the composition in which the composition as contemplated herein is contained.

In various embodiments, the liquid surfactant composition according to the composition also contains, in addition to the amylase having an amino acid sequence which is at least about 70% identical to the amino acid sequence specified in SEQ ID NO:1 over the entire length thereof, at least one additional α-amylase.

Examples of additional amylases are the α-amylases of *Baciullus licheniformis*, of *B. amyloliquefaciens* and of *B. stearothermophilus*, and the developments thereof that are improved for use in washing or cleaning agents.

Compositions which are preferred as contemplated herein contain α-amylase in a total amount of from about 0.01 to about 2.0 wt. %, in particular of from about 0.02 to about 0.6 wt. %.

It is preferred as contemplated herein if the liquid surfactant compositions also contain at least one polyalkoxylated polyamine.

Within the context of the present disclosure and its individual aspects, the polyalkoxylated polyamine is a polymer having an N-atom-containing backbone which carries polyalkoxy groups on the N atoms. The polyamine has primary amino functions at the ends (terminus and/or side chains) and preferably both secondary and tertiary amino functions internally; optionally, it may also have merely secondary amino functions internally, such that a linear polyamine, and not a branched chain polyamine, is produced. The ratio of primary to secondary amino groups in the polyamine is preferably in the range of from about 1:0.5 to about 1:1.5, in particular in the range of from about 1:0.7 to about 1:1. The ratio of primary to tertiary amino groups in the polyamine is preferably in the range of from about 1:0.2 to about 1:1, in particular in the range of from about 1:0.5 to about 1:0.8. The polyamine preferably has an average molar mass in the range of from about 500 g/mol to about 50,000 g/mol, in particular from about 550 g/mol to about 5,000 g/mol. The N atoms in the polyamine are separated from one another by alkylene groups, preferably by alkylene groups having from 2 to 12 C atoms, in particular from 2 to 6 C atoms, although it is not necessary for all the alkylene groups to have the same number of C atoms. Ethylene groups, 1,2-propylene groups, 1,3-propylene groups, and mixtures thereof are particularly preferred. Polyamines which carry ethylene groups as said alkylene groups are referred to as polyethylenimine or PEI. PEI is a polymer that is particularly preferred as contemplated herein having an N-atom-containing backbone.

The primary amino function in the polyamine can carry 1 or 2 polyalkoxy groups and the secondary amino functions can carry 1 polyalkoxy group, it not being necessary that every amino function is alkoxy group-substituted. The average number of alkoxy groups per primary and secondary amino function in the polyalkoxylated polyamine is preferably from 1 to 100, in particular from 5 to 50. The alkoxy groups in the polyalkoxylated polyamine are preferably polypropoxy groups which are directly bound to N atoms, and/or polyethoxy groups which are bound to potentially present propoxy functional groups and to N atoms which do not carry propoxy groups.

Polyethoxylated polyamines are obtained by reacting polyamines with ethylene oxide (abbreviated to EO). The polyalkoxylated polyamines containing ethoxy and propoxy groups are preferably accessible by reacting polyamines with propylene oxide (abbreviated to PO) and subsequent reaction with ethylene oxide.

The average number of propoxy groups per primary and secondary amino function in the polyalkoxylated polyamine is preferably from 1 to 40, in particular from 5 to 20.

The average number of ethoxy groups per primary and secondary amino function in the polyalkoxylated polyamine is preferably from 10 to 60, in particular from 15 to 30.

If desired, the terminal OH function polyalkoxy substituents in the polyalkoxylated polyamine can be partially or completely etherified with a $C_1$-$C_{10}$ alkyl group, in particular a $C_1$-$C_3$ alkyl group.

Polyalkoxylated polyamines which are particularly preferred as contemplated herein can be selected from polyamine reacted with 45EO for each primary and secondary amino function, PEIs reacted with 43EO for each primary and secondary amino function, PEIs reacted with 15EO+5PO for each primary and secondary amino function, PEIs reacted with 15PO+30EO for each primary and secondary amino function, PEIs reacted with 5PO+39.5EO for each primary and secondary amino function, PEIs reacted with 5PO+15EO for each primary and secondary amino function, PEIs reacted with 10PO+35EO for each primary and secondary amino function, PEIs reacted with 15PO+30EO for each primary and secondary amino function, and PEIs reacted with 15PO+5EO for each primary and secondary amino function. A very particularly preferred alkoxylated polyamine is PEI having a content of from 10 to 20 nitrogen atoms reacted with 20 units of EO per primary or secondary amino function of the polyamine.

A further preferred subject matter of the present disclosure is the use of polyalkoxylated polyamines which can be obtained by reacting polyamines with ethylene oxide and optionally also propylene oxide. If polyamines polyalkoxylated using ethylene oxide and propylene oxide are used, the proportion of propylene oxide to the total amount of the alkylene oxide is preferably from about 2 mol. % to about 18 mol. %, in particular from about 8 mol. % to about 15 mol. %.

The liquid composition contains polyalkoxylated polyamines in a total amount of from about 0.1 to about 10 wt. %, in particular of from about 0.5 to about 5.0 wt. %, based on the total weight of the composition.

In addition to the ingredients as contemplated herein, the liquid surfactant compositions as contemplated herein can contain additional ingredients which further improve the practical and/or aesthetic properties of the washing agent. Within the context of the present disclosure, the composition as contemplated herein preferably additionally contains one or more substances from the group of bleaching agents, complexing agents, builders, electrolytes, pH adjusters, perfumes, perfume carriers, fluorescing agents, dyes, hydrotropic substances, foam inhibitors, silicone oils, polymeric thickening agents, anti-redeposition agents, shrinkage preventers, anti-crease agents, dye transfer inhibitors, antimicrobial active ingredients, germicides, fungicides, antioxidants, preservatives, corrosion inhibitors, antistatic agents, bittering agents, ironing aids, repellents and impregnating agents, anti-swelling and anti-slip agents, softening components, UV absorbers, or combinations thereof.

A polymeric thickening agent is understood as contemplated herein to mean a polymeric compound which has an average molar mass (weight average $M_w$) of more than about 1500 g/mol and which increases the viscosity of the composition as contemplated herein in a use amount of about 0.1 wt. %. As contemplated herein, polyacrylates are particularly suitable as a polymeric thickening agent. The polyacrylates include polyacrylate or polymethacrylate thickening agents, such as the homopolymers of acrylic acid (INCI name according to the "International Dictionary of Cosmetic Ingredients" of "The Cosmetic, Toiletry and Fragrance Association (CTFA)": Carbomer) which have a high molecular weight, are crosslinked with a polyalkyenyl polyether, in particular an allyl ether of saccharose, pentaerythritol or propylene, and are referred to as carboxyvinyl polymers. Such polyacrylic acids are available inter alia from 3V Sigma under the trade name Polygel®, for example Polygel DA, and from Noveon under the trade name Carbopol®, for example Carbopol 940 (molecular weight approximately 4,000,000), Carbopol 941 (molecular weight approximately 1,250,000) or Carbopol 934 (molecular weight approximately 3,000,000). Furthermore, this includes the following acrylic acid copolymers: (i) copolymers of two or more monomers from the group of acrylic acid, methacrylic acid and the simple esters thereof, preferably formed with $C_{1-4}$ alkanols (INCI Acrylates Copolymer), which include, for example, the copolymers of methacrylic acid, butyl acrylate and methyl methacrylate (CAS name in accordance with the Chemical Abstracts Service: 25035-69-2) or of butyl acrylate and methyl methacrylate (CAS 25852-37-3) and which are obtainable, for example, from Rohm & Haas under the trade names Aculyn® and Acusol® and from Degussa (Goldschmidt) under the trade name Tego® Polymer, for example the anionic, non-associative polymers Aculyn 22, Aculyn 28, Aculyn 33 (crosslinked), Acusol 810, Acusol 823 and Acusol 830 (CAS 25852-37-3); (ii) crosslinked acrylic acid copolymers having a high molecular weight, which include, for example, the copolymers of $C_{10-30}$ alkyl acrylates which are crosslinked with an allyl ether of saccharose or of pentaerythritol and which comprise one or more monomers from the group of acrylic acid, methacrylic acid and the simple esters thereof, preferably formed with $C_{1-4}$ alkanols (INCI Acrylates/C10-30 Alkyl Acrylate Crosspolymer), and which are obtainable, for example, from Noveon under the trade name Carbopol®, e.g. the hydrophobized Carbopol ETD2623 and Carbopol 1382 (INCI Acrylates/C10-30 Alkyl Acrylate Crosspolymer) and Carbopol Aqua 30 (formerly Carbopol EX 473).

It is preferred as contemplated herein if the liquid composition contains polymeric thickening agents in a total amount of from 0 to about 0.1 wt. %, in particular of from 0 to about 0.05 wt. %, particularly preferably of from 0 to about 0.01 wt. %, based on the total weight of the composition. Very particularly preferably, the composition is free of polymeric thickening agents.

All substances which destroy or absorb dyes by employing oxidation, reduction or adsorption, and thus decolorize materials, can be used as bleaching agents. These include, inter alia, hypohalite-containing bleaching agents, hydrogen peroxide, perborate, percarbonate, peracetic acid, diperoxyazelaic acid, diperoxy dodecanedioic acid and oxidative enzyme systems.

Silicates, aluminum silicates (in particular zeolites), carbonates, salts of organic di- and polycarboxylic acids and mixtures of these substances are in particular referred to as builders which can be contained in the composition as contemplated herein.

Organic builders which may be present in the composition as contemplated herein are, for example, the polycarboxylic acids that can be used in the form of the sodium salts thereof, polycarboxylic acids being understood to mean those carboxylic acids that carry more than one acid function. These include, for example, citric acid, adipic acid, succinic acid, glutaric acid, malic acid, tartaric acid, maleic acid, fumaric acid, saccharic acids, aminocarboxylic acids (including MGDA and/or GLDA), and mixtures thereof. Preferred salts are the salts of polycarboxylic acids such as citric acid, adipic acid, succinic acid, glutaric acid, tartaric acid, saccharic acids, and mixtures thereof.

Polymeric polycarboxylates are also suitable as organic builders. These are, for example, the alkali metal salts of polyacrylic acid or of polymethacrylic acid, for example those having a relative molecular mass of from about 600 to about 750,000 g/mol.

Suitable polymers are in particular polyacrylates which preferably have a molecular mass of from about 1000 to about 15,000 g/mol. Due to their superior solubility, the short-chain polyacrylates, which have molar masses of from about 1,000 to about 10,000 g/mol, and particularly preferably of from about 1,000 to about 5,000 g/mol, can be preferred from this group.

Copolymers of polycarboxylates, in particular those of acrylic acid with methacrylic acid and acrylic acid or methacrylic acid with maleic acid, are also suitable. The polymers may also contain allyl sulfonic acids, allyl oxybenzene sulfonic acid and methallyl sulfonic acid in the form of monomers, in order to improve solubility in water.

Soluble builders, such as citric acid, or acrylic polymers having a molar mass of from about 1,000 to about 5,000 g/mol, are preferably used in the liquid compositions as contemplated herein.

In different embodiments of the present disclosure, the agents further contain a complexing agent selected from the group of ethylenediamine disuccinic acid (EDDS), or ethylenediaminetetraacetic acid (EDTA). A mixture of ethylenediamine disuccinic acid (EDDS) and ethylenediaminetetraacetic acid (EDTA) is particularly preferred. In further preferred embodiments, the composition as contemplated herein contains (a) ethylenediaminetetraacetic acid (EDTA) in an amount of from about 0.5-4 wt. %, preferably in an amount of from about 1 wt. %, and/or (b) ethylenediamine disuccinic acid in an amount of from about 0.5-4 wt. %, preferably in an amount of from about 1 wt. %, very particularly preferably from about 1 wt. % EDTA and about 1 wt. % EDDS. It has surprisingly been found that the enzymes in the compositions as contemplated herein remain stable even in the presence of comparatively higher concentrations of these complexing agents.

A second subject matter of the present disclosure is the use of a liquid surfactant composition of the first subject matter of the present disclosure in a method for washing textiles.

A third subject matter of the present disclosure is a method for washing textiles, comprising providing a washing liquor by
(i) dosing a liquid surfactant composition of the first subject matter of the present disclosure,
(ii) mixing this dosage into at least one solvent, in particular water, and
(iii) bringing the resulting mixture into contact with at least one textile.

As contemplated herein, a washing liquor is at least the total amount of the components used in (i) and (iii).

Methods for cleaning textiles are generally exemplified in that various substances that have a cleaning effect are applied to the item to be cleaned in a plurality of method steps and washed off after the contact time, or in that the item to be cleaned is treated with a composition of the first subject matter of the present disclosure or a solution of said composition. It is preferred as contemplated herein if, within the context of pre-treatment of textiles, at least one part of said liquid composition is first directly applied to selected stained parts of the textile and, after a reaction time (of preferably from about 30 to about 300 seconds), the at least one solvent from step (ii), the remainder of the textiles from step (iii) and optionally the remainder of said liquid composition are subsequently combined to provide the washing liquor.

If the at least one solvent of the method as contemplated herein is added to the washing liquor, it is preferred as contemplated herein to combine one part by volume of said liquid composition with from about 5 to about 3000 parts by volume of the at least one solvent.

EXAMPLES

Example 1

Washing Test

Washing Agent Matrix Used

| Trade or chemical name | % | Washing agent 1 | Washing agent 2 |
|---|---|---|---|
| Distilled water | 100 | Remainder | |
| 1,2-propanediol (technical grade) | 100 | 0-5 | |
| Sodium hydroxide (50% solution) | 50 | 2.75 | |
| Boric acid | 100 | 0-2 | |
| Citric acid (water-free) | 100 | 0-5 | |
| C12-18 fatty alcohol ether 7EO | 100 | 3-7 | |
| LAS (Stepan Bio-Soft S-118) | 96 | 2-6 | |
| C12-18 soap | 100 | 0-4 | |
| EDTA | 40 | 0-2 | 0-2 |
| EDDS | 37 | — | 0-2 |
| Sodium laureth sulfate 2EO | 70 | 10-20 | |
| C12-18 fatty alcohol ether sulfate 7EO, Na salt | 81 | 1.5-4.5 | |
| Ethoxylated PEI (Sokalan HP 20) | 80 | 0-2 | |
| Ethanol 96% (MEK, denatured) | 93 | 0-5 | |
| Defoamer | 100 | 0.04 | |
| Sodium formate (solution 40%) | 40 | 0.3 | |
| Optical brightener | 90 | 0-0.2 | |
| Amylase | 100 | 0-1 | |
| Cellulase 1 | 100 | 0-0.5 | |
| Cellulase 2 | 100 | 0-0.5 | |
| Lipase | 100 | — | 0-0.5 |
| Mannanase | 100 | 0-0.5 | |
| Protease | 100 | 0-2 | |
| Perfume | 100 | 0-2 | |
| Liquitint Blue HP | t.q. | 0.0022 | |

Washing Test for Determining the Washing Performance of the Amylase According to SEQ ID NO:1

The reference amylase ("current Amylase") and the amylase as contemplated herein in accordance with SEQ ID NO:1 ("New Amylase") were stored for 4 weeks at a temperature of 30° C. in the above-mentioned washing agent matrix (washing agent 2). Subsequently, their respective enzyme monitors ΔY were measured in the front loader and top loader washing machines.

Stains:
1. CFT C03 (milk chocolate/black carbon)
2. CFT C05 (blood/milk/ink)
3. CFT CS02 (cocoa)
4. CFT CS29 (tapioca starch, colored)
5. EMPA 111 (blood)
6. EMPA 112 (cocoa)
7. EMPA 117 (blood/milk/ink)
8. EMPA 160 (chocolate cream)
9. EMPA 162 (corn starch, colored)
10. EMPA 163 (oatmeal)
11. EMPA 165 (chocolate pudding)
12. H-MR-B (milk/black carbon)
13. WFK10EG (egg yolk)
14. WFK 10N (whole egg/pigment)
15. WFK 10R (corn starch/pigment)

Figure 1:
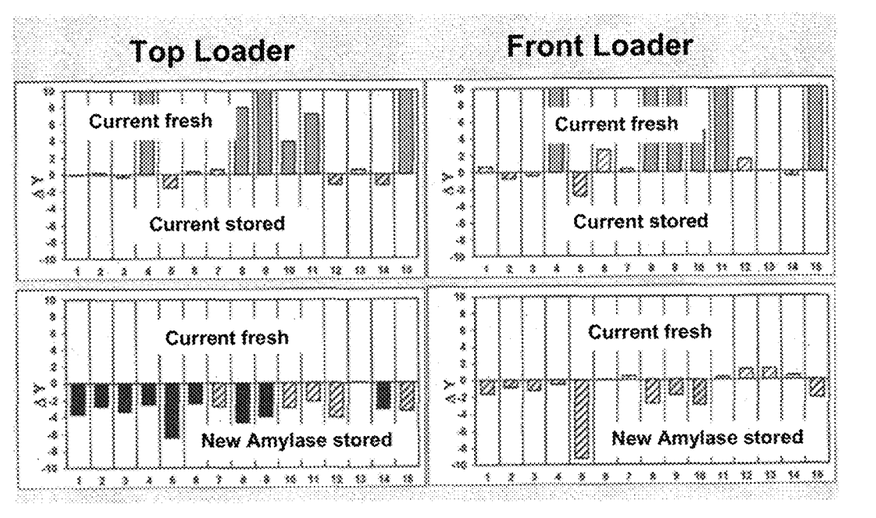

The amylase used in the prior art ("current Amylase") demonstrates a significant decrease in the washing performance after storage (see FIG. 1). In contrast, the amylase as contemplated herein ("New Amylase"; SEQ ID NO:1) demonstrates a significantly improved washing performance after storage.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A liquid surfactant composition, comprising, based on the total weight of the composition,
a) a total amount of from about 2.0 to about 8.0 wt. % $C_9$-$C_{20}$ alkylbenzene sulfonate,
b) a total amount of from about 10.0 to about 18.0 wt. % $R^1$—O—$(CH_2CH_2O)_n$—$SO_3M$, in which $R^1$ represents a $C_{12-18}$ alkyl group, n represents a number from about 2 to about 3, and M represents a monovalent cation,
c) a total amount of from about 1.0 to about 6.0 wt. % $R^2$—O—$(CH_2CH_2O)_m$—$SO_3M'$, in which $R^2$ represents a $C_{12-18}$ alkyl group, m represents a number from 7 to 8, and M' represents a monovalent cation,
d) a total amount of from about 2.0 to about 10.0 wt. % fatty alcohol ethoxylate(s),
e) water, and
f) at least one amylase, wherein the amylase has an amino acid sequence which is at least 90% identical to the amino acid sequence specified in SEQ ID NO:1 over the entire length thereof, and
g) a protease having an amino acid sequence that is at least 90% identical to the amino acid sequence specified in SEQ ID NO:2 over the total length thereof and wherein said protease has the amino acid substitutions R99E and L256E with respect to SEQ ID NO:2.

2. The liquid surfactant composition according to claim 1, wherein the amylase has an amino acid sequence which is at least about 90.5%, about 91%, about 91.5%, about 92%, about 92.5%, about 93%, about 93.5%, about 94%, about 94.5%, about 95%, about 95.5%, about 96%, about 96.5%, about 97%, about 97.5%, about 98%, about 98.5%, about 98.8%, about 99.0%, about 99.2%, about 99.4%, about 99.6% about 99.8%, or about 100%, identical to the amino acid sequence specified in SEQ ID NO:1 over the entire length thereof.

3. The liquid surfactant composition according to claim 1, wherein the alkylbenzene sulfonate according to a) comprises one or more compounds of formula a, (a)

in which R' and R" together contain from 8 to 19 C atoms and $X^+$ represents a monovalent cation.

4. The liquid surfactant composition according to claim 1, wherein the fatty alcohol ethoxylate according to d) is $R^3$—O—$(CH_2CH_2O)_o$—H, in which $R^3$ represents a $C_{12-18}$ alkyl group and o represents a number from 7 to 8.

5. The liquid surfactant composition according to claim 1, wherein
    (a) n=2,
    (b) m=7,
    (c) M=$Na^+$, and/or
    (d) M'=$Na^+$.

6. The liquid surfactant composition according to claim 1, wherein the at least one protease has an amino acid sequence which is at least about 95% identical to the amino acid sequence specified in SEQ ID NO:2 over the total length thereof.

7. The liquid surfactant composition according to claim 1, wherein the weight ratio of surfactant component a) to surfactant component b) is from about 1:9 to about 1:2.

8. The liquid surfactant composition according to claim 7, wherein the weight ratio of surfactant component a) to surfactant component b) is from about 1:6 to about 1:3.

9. The liquid surfactant composition according to claim 7, wherein the weight ratio of surfactant component a) to surfactant component b) is from about 1:5 to about 1:3.

10. The liquid surfactant composition according to claim 1, further comprising one or more substances selected from the group of bleaching agents, complexing agents, builders, electrolytes, pH adjusters, perfumes, perfume carriers, fluorescing agents, dyes, hydrotropic substances, foam inhibitors, silicone oils, polymeric thickening agents, anti-redeposition agents, shrinkage preventers, anti-crease agents, dye transfer inhibitors, antimicrobial active ingredients, germicides, fungicides, antioxidants, preservatives, corrosion inhibitors, antistatic agents, bittering agents, ironing aids, repellents and impregnating agents, anti-swelling and anti-slip agents, softening components and UV absorbers, or combinations thereof.

11. The use of a liquid surfactant composition according to claim 1 in a method for washing textiles.

12. The liquid surfactant composition according to claim 1, wherein the fatty alcohol ethoxylate(s) is present in a total amount of from about 2.5 to about 7.5 wt. % based on the total weight of the composition.

13. The liquid surfactant composition according to claim 1, wherein the fatty alcohol ethoxylate(s) is present is a total amount of from about 4.0 to about 6.0 wt. % based on the total weight of the composition.

14. The liquid surfactant composition according to claim 3, wherein R' and R" of formula a together comprises 9 to 12 C atoms.

15. The liquid surfactant composition according to claim 3, wherein the monovalent cation of formula a is selected from the group of $Na^+$, $K^+$, HO—$CH_2CH_2NH_3^+$, or (HO—$CH_2CH_2)_3NH^+$.

16. The liquid surfactant composition according to claim 1, wherein the protease further comprises the amino acid substitution S154D and one or more amino acid substitutions selected from S3T, V4I, and V199I with respect to SEQ ID NO:2.

17. A method for washing textiles, comprising providing a washing liquor by
    (i) dosing a liquid surfactant composition according to claim 1,
    (ii) mixing this dosage into at least one solvent, and
    (iii) bringing the resulting mixture into contact with at least one textile.

18. A liquid surfactant composition comprising, based on a total weight of the composition,
    a) a total amount of from about 2.0 to about 8.0 wt. % $C_{12}$ alkylbenzene sulfonate sodium salt;
    b) a total amount of from about 10.0 to about 18.0 wt. % $R^1$—O—$(CH_2CH_2O)_2$—$SO_3Na$, wherein $R^1$ represents a $C_{12}$-$C_{18}$ alkyl group;
    c) a total amount of from about 1.0 to 6.0 wt. % $R^2$—O—$(CH_2CH_2O)_7$—$SO_3Na$, wherein $R^2$ represents a $C_{12}$-$C_{18}$ alkyl group;
    d) a total amount of from about 4.0 to 6.0 wt. % at least one fatty alcohol ethoxylate of the formula $R^3$—O—$(CH_2CH_2O)_o$—H, wherein $R^3$ represents a $C_{12}$-$C_{18}$ alkyl group and o represents a number from 7 to 8;
    e) water;
    f) at least one amylase having an amino acid sequence at least 90% identical to the amino acid sequence specified in SEQ ID NO:1 over the entire length thereof; and
    g) a protease having an amino acid sequence at least 90% identical to the amino acid sequence specified in SEQ ID NO:2 over the total length thereof and wherein said protease has the amino acid substitutions R99E and L256E with respect to SEQ ID NO:2.

19. The liquid surfactant composition according to claim 18, wherein the protease further comprises the amino acid substitution S154D and one or more amino acid substitutions selected from S3T, V4I, and V199I with respect to SEQ ID NO:2.

* * * * *

SEQUENCE LISTING

<160> NUMBER OF SEQ ID NOS: 2

<210> SEQ ID NO 1
<211> LENGTH: 482
<212> TYPE: PRT
<213> ORGANISM: Artificial Sequence
<220> FEATURE:
<223> OTHER INFORMATION: Hybridprotein

<400> SEQUENCE: 1

His Asp Gly Thr Asn Gly Thr Ile Met Gln Tyr Phe Glu Trp Asn Val
1               5                   10                  15

Pro Asn Asp Gly Gln His Trp Asn Arg Leu His Asn Asn Ala Gln Asn
            20                  25                  30

Leu Lys Asn Ala Gly Ile Thr Ala Ile Trp Ile Pro Pro Ala Trp Lys
        35                  40                  45

Gly Thr Ser Gln Ser Asp Thr Gly Tyr Gly Ala Tyr Asp Leu Tyr Asp
    50                  55                  60

```
Leu Gly Glu Phe Asn Gln Arg Gly Thr Val Arg Thr Lys Tyr Gly Thr
 65                  70                  75                  80

Lys Ala Glu Leu Glu Arg Ala Ile Arg Ser Leu Lys Ala Asn Gly Ile
                 85                  90                  95

Gln Val Tyr Gly Asp Val Val Met Asn His Lys Ala Gly Ala Asp Gln
                100                 105                 110

Thr Glu Gln Val Gln Ala Val Glu Val Asn Pro Gln Asn Arg Asn Gln
                115                 120                 125

Glu Val Ser Gly Thr Tyr Gln Ile Glu Ala Trp Thr Gly Phe Asn Phe
            130                 135                 140

Pro Gly Arg Gly Asn Gln His Ser Ser Phe Lys Trp Arg Trp Tyr His
145                 150                 155                 160

Phe Asp Gly Thr Asp Phe Asp Gln Ser Arg Gly Leu Ser Asn Arg Ile
                165                 170                 175

Tyr Lys Phe Arg Thr Lys Ala Trp Asp Trp Glu Val Asp Thr Glu Phe
                180                 185                 190

Gly Asn Tyr Asp Tyr Leu Met Tyr Ala Asp Leu Asp Met Asp His Pro
            195                 200                 205

Glu Val Ile Asn Glu Leu Asn Arg Trp Gly Val Trp Tyr Ala Asn Thr
            210                 215                 220

Leu Asn Leu Asp Gly Phe Arg Leu Asp Ala Val Lys His Ile Lys Phe
225                 230                 235                 240

Ser Phe Met Arg Asp Trp Leu Gly His Val Arg Gly Gln Thr Gly Lys
                245                 250                 255

Asn Leu Phe Ala Val Ala Glu Tyr Trp Lys Asn Asp Leu Gly Ala Leu
                260                 265                 270

Glu Asn Tyr Leu Ser Lys Thr Asn Trp Thr Met Ser Ala Phe Asp Val
            275                 280                 285

Pro Leu His Tyr Asn Leu Tyr Gln Ala Ser Asn Ser Ser Gly Asn Tyr
            290                 295                 300

Asp Met Arg Asn Leu Leu Asn Gly Thr Leu Val Gln Arg His Pro Ser
305                 310                 315                 320

His Ala Val Thr Phe Val Asp Asn His Asp Thr Gln Pro Gly Glu Ala
                325                 330                 335

Leu Glu Ser Phe Val Gln Gly Trp Phe Lys Pro Leu Ala Tyr Ala Thr
                340                 345                 350

Ile Leu Thr Arg Glu Gln Gly Tyr Pro Gln Val Phe Tyr Gly Asp Tyr
            355                 360                 365

Tyr Gly Ile Pro Ser Asp Gly Val Pro Ser Tyr Arg Gln Gln Ile Asp
            370                 375                 380

Pro Leu Leu Ala Ala Arg Gln Gln Tyr Ala Tyr Gly Thr Gln His Asp
385                 390                 395                 400

Tyr Leu Asp Asn Gln Asp Val Ile Gly Trp Thr Arg Glu Gly Asp Ser
                405                 410                 415

Ala His Ala Gly Ser Gly Leu Ala Thr Val Met Ser Asp Gly Pro Gly
                420                 425                 430

Gly Ser Lys Thr Met Tyr Val Gly Thr Ala His Ala Gly Gln Val Phe
            435                 440                 445

Lys Asp Ile Thr Gly Asn Arg Thr Asp Thr Val Thr Ile Asn Ser Ala
            450                 455                 460

Gly Asn Gly Thr Phe Arg Cys Asn Lys Gly Ser Val Ser Ile Trp Val
465                 470                 475                 480
```

Lys Gln

```
<210> SEQ ID NO 2
<211> LENGTH: 269
<212> TYPE: PRT
<213> ORGANISM: Bacillus lentus

<400> SEQUENCE: 2
```

```
Ala Gln Ser Val Pro Trp Gly Ile Ser Arg Val Gln Ala Pro Ala Ala
1               5                   10                  15

His Asn Arg Gly Leu Thr Gly Ser Gly Val Lys Val Ala Val Leu Asp
                20                  25                  30

Thr Gly Ile Ser Thr His Pro Asp Leu Asn Ile Arg Gly Gly Ala Ser
            35                  40                  45

Phe Val Pro Gly Glu Pro Ser Thr Gln Asp Gly Asn Gly His Gly Thr
        50                  55                  60

His Val Ala Gly Thr Ile Ala Ala Leu Asn Asn Ser Ile Gly Val Leu
65                  70                  75                  80

Gly Val Ala Pro Ser Ala Glu Leu Tyr Ala Val Lys Val Leu Gly Ala
                85                  90                  95

Asp Gly Arg Gly Ala Ile Ser Ser Ile Ala Gln Gly Leu Glu Trp Ala
                100                 105                 110

Gly Asn Asn Gly Met His Val Ala Asn Leu Ser Leu Gly Ser Pro Ser
            115                 120                 125

Pro Ser Ala Thr Leu Glu Gln Ala Val Asn Ser Ala Thr Ser Arg Gly
130                 135                 140

Val Leu Val Val Ala Ala Ser Gly Asn Ser Gly Ala Ser Ser Ile Ser
145                 150                 155                 160

Tyr Pro Ala Arg Tyr Ala Asn Ala Met Ala Val Gly Ala Thr Asp Gln
                165                 170                 175

Asn Asn Asn Arg Ala Ser Phe Ser Gln Tyr Gly Ala Gly Leu Asp Ile
            180                 185                 190

Val Ala Pro Gly Val Asn Val Gln Ser Thr Tyr Pro Gly Ser Thr Tyr
        195                 200                 205

Ala Ser Leu Asn Gly Thr Ser Met Ala Thr Pro His Val Ala Gly Ala
    210                 215                 220

Ala Ala Leu Val Lys Gln Lys Asn Pro Ser Trp Ser Asn Val Gln Ile
225                 230                 235                 240

Arg Asn His Leu Lys Asn Thr Ala Thr Ser Leu Gly Ser Thr Asn Leu
                245                 250                 255

Tyr Gly Ser Gly Leu Val Asn Ala Glu Ala Ala Thr Arg
            260                 265
```